(12) United States Patent
Jurach, Jr. et al.

(10) Patent No.: US 9,201,870 B2
(45) Date of Patent: Dec. 1, 2015

(54) METHOD AND SYSTEM FOR PROVIDING TRANSLATED DYNAMIC WEB PAGE CONTENT

(75) Inventors: James Edward Jurach, Jr., Austin, TX (US); David Steven Blumenthal, Austin, TX (US)

(73) Assignee: First Data Corporation, Greenwood Village, CO (US)

(*) Notice: Subject to any disclaimer, the term of this patent is extended or adjusted under 35 U.S.C. 154(b) by 1468 days.

(21) Appl. No.: 12/020,496

(22) Filed: Jan. 25, 2008

(65) Prior Publication Data

US 2009/0192783 A1 Jul. 30, 2009

(51) Int. Cl.
*G06F 17/28* (2006.01)

(52) U.S. Cl.
CPC .................. *G06F 17/2827* (2013.01)

(58) Field of Classification Search
CPC ..... G06F 17/20; G06F 17/28; G06F 17/2881; G06F 17/3043; G06F 17/2872; G06F 17/289; G06F 19/322; G06F 21/6209; G06F 17/2785; G06F 17/2827; G06F 17/2836; G06F 17/30616; G06F 17/30696; G06F 21/00; G06F 21/62; G06F 21/6245; G06F 17/211; G06F 17/275; G06F 17/30864
USPC ................. 704/1–10, 231, 235, 270
See application file for complete search history.

(56) References Cited

U.S. PATENT DOCUMENTS 5,256,067 A * 10/1993 Gildea et al. ................... 434/169
5,960,080 A * 9/1999 Fahlman et al. .............. 380/252
6,119,078 A 9/2000 Kobayakawa et al.

(Continued)

FOREIGN PATENT DOCUMENTS

AU PCT/AU00/00783 7/1999
WO 0102994 A1 1/2001

OTHER PUBLICATIONS

Lin, "Machine Translation for Information Access Across the Language Barrier; the MuST System," In Machine Translation Summit VII, Sep. 1999, 9 pages, Singapore.*

(Continued)

*Primary Examiner* — Abdelali Serrou
(74) *Attorney, Agent, or Firm* — Sutherland Asbill & Brennan, LLP

(57) ABSTRACT

A method, system and computer-readable storage medium are provided for generating translated dynamic Web page content comprising a phrasebook storing source phrases and translated phrases, a Web server, and an application server that generates dynamic Web page content in response to Web page requests and includes a translation engine that replaces source phrases in the dynamic Web page with a corresponding translated phrase stored in the phrasebook. In another embodiment the phrasebook also stores translations in a second dialect so that source phrases in a dynamic Web page can be translated into two or more dialects. Also provided is a system of collecting translatable dynamic Web page content including a Web server, a database comprising source phrases and corresponding translated phrases, and an application server that generates a dynamic Web page, identifies within the dynamic Web page a candidate phrase for addition to the database, and adds to the database a translatable component of the candidate phrase. Also disclosed is a method for maintaining a database of translated content whereby translatable dynamic Web page content is collected, translated, and added to the database.

25 Claims, 3 Drawing Sheets

(56) References Cited

U.S. PATENT DOCUMENTS

| | | | | |
|---|---|---|---|---|
| 6,360,196 | B1* | 3/2002 | Poznanski et al. | 704/8 |
| 6,385,568 | B1* | 5/2002 | Brandon et al. | 704/7 |
| 6,401,105 | B1 | 6/2002 | Carlin et al. | |
| 6,463,404 | B1* | 10/2002 | Appleby | 704/9 |
| 6,470,306 | B1 | 10/2002 | Pringle et al. | |
| 6,526,426 | B1* | 2/2003 | Lakritz | 715/264 |
| 6,684,388 | B1 | 1/2004 | Gupta et al. | |
| 6,687,736 | B1 | 2/2004 | Lee | |
| 6,819,338 | B2 | 11/2004 | Heasman et al. | |
| 6,857,022 | B1 | 2/2005 | Scanlan | |
| 6,865,716 | B1 | 3/2005 | Thurston | |
| 6,985,850 | B1 | 1/2006 | Scanlan | |
| 6,993,471 | B1 | 1/2006 | Flanagan et al. | |
| 6,996,520 | B2 | 2/2006 | Levin | |
| 7,016,977 | B1 | 3/2006 | Dunsmoir et al. | |
| 7,100,152 | B1 | 8/2006 | Birum et al. | |
| 7,110,938 | B1* | 9/2006 | Cheng et al. | 704/5 |
| 7,130,792 | B2 | 10/2006 | Tokieda et al. | |
| 7,139,696 | B2 | 11/2006 | Tokieda et al. | |
| 7,143,026 | B2 | 11/2006 | Challenger et al. | |
| 7,165,020 | B2 | 1/2007 | Lissauer et al. | |
| 7,171,348 | B2 | 1/2007 | Scanlan | |
| 7,171,352 | B2 | 1/2007 | Chang et al. | |
| 7,174,506 | B1 | 2/2007 | Dunsmoir et al. | |
| 7,207,005 | B2* | 4/2007 | Lakritz | 715/201 |
| 7,238,024 | B2 | 7/2007 | Rehbein et al. | |
| 7,292,987 | B2 | 11/2007 | Flanagan et al. | |
| 7,627,479 | B2* | 12/2009 | Travieso et al. | 704/277 |
| 7,801,720 | B2* | 9/2010 | Satake et al. | 704/4 |
| 7,974,831 | B2* | 7/2011 | Kamatani et al. | 704/4 |
| 7,974,832 | B2* | 7/2011 | Furuuchi et al. | 704/7 |
| 2002/0038357 | A1* | 3/2002 | Haverstock et al. | 709/218 |
| 2002/0123878 | A1 | 9/2002 | Menke | |
| 2002/0123879 | A1 | 9/2002 | Spector | |
| 2002/0152063 | A1 | 10/2002 | Tokieda et al. | |
| 2002/0152262 | A1* | 10/2002 | Arkin et al. | 709/202 |
| 2002/0193983 | A1 | 12/2002 | Tokieda et al. | |
| 2003/0084401 | A1* | 5/2003 | Abel et al. | 715/501.1 |
| 2003/0135358 | A1 | 7/2003 | Lissauer et al. | |
| 2003/0236658 | A1 | 12/2003 | Yam | |
| 2004/0049374 | A1 | 3/2004 | Breslau et al. | |
| 2004/0102956 | A1 | 5/2004 | Levin | |
| 2004/0128614 | A1* | 7/2004 | Andrews et al. | 715/501.1 |
| 2004/0167768 | A1 | 8/2004 | Travieso et al. | |
| 2004/0167784 | A1 | 8/2004 | Travieso et al. | |
| 2004/0168132 | A1 | 8/2004 | Travieso et al. | |
| 2004/0230536 | A1* | 11/2004 | Fung et al. | 705/64 |
| 2004/0237044 | A1 | 11/2004 | Travieso et al. | |
| 2005/0131815 | A1* | 6/2005 | Fung et al. | 705/39 |
| 2005/0149315 | A1 | 7/2005 | Flanagan et al. | |
| 2005/0246156 | A1 | 11/2005 | Scanlan | |
| 2006/0200339 | A1* | 9/2006 | Satake et al. | 704/4 |
| 2006/0282884 | A1* | 12/2006 | Pomerantz | 726/5 |
| 2007/0055739 | A1 | 3/2007 | Marmor | |
| 2007/0157123 | A1* | 7/2007 | Ikawa et al. | 715/816 |
| 2009/0044254 | A1* | 2/2009 | Tian | 726/4 |
| 2009/0157381 | A1* | 6/2009 | Furuuchi et al. | 704/7 |

OTHER PUBLICATIONS

WizTom for the Web, Whitepaper for Version 3.5, Jan. 2005, http://www.assima.net/brochures/WizTom%20for%20the%20Web%20-%20White%20Paper.pdf.

Assima Multilingual Solution (AMS) Jan. 2008, http://research.pepro.co.uk/yiewer/printdocument.

WizTom for the Windows, Whitepaper for Version 3.5, Jan. 2005, www.wizart.com, http://www.assima.net/brochures/localisation_english.pdf.

WizTom Translation Pad—Step by Step, 2002 WizArt Software, http://www.wizart.com/en/wizstart/wizpad.htm.

WizTom Sudio, 2006 WizArt Software, http://www.wizart.com/en/products/wiztom_studio.shtml.

Make localization a breeze, 2006 WizArt Software, http://www.wizart.com/en/index.shtml.

Dynamic Web Translation Using Petal:: I18N, Roland, Andrew, Jun. 27, 2007, So what's with the lab coat? http://cleverdomain.org/yapc07/.

PageTranslator by Visual Inspirations, Inc., Jul. 22, 2004, http://www.exefind.com/pagetranslator-P12819.html.

An Introduction to Translation & Localization for the Busy Executive, Acclaro, Inc., 2007, http://www.acclaro.com/res.htm.

TransMotion, The Quick, Simple and Affordable Way to Add Multilingual Capabilities to your Website, Copyright 2008, http://www.motionpoint.com/translation_services.aspx.

WizTom for Windows—Step by Step, http://www.wizart.com/en/wizstart/wizwin.htm, accessed Dec. 18, 2007.

WizTom for the Web—Step by Step, http://www.wizart.com/en/wizstart/wizweb.htm, accessed Dec. 18, 2007.

WizTom for Java—Step by Step, http://www.wizart.com/en/wizstart/wizjava.htm, accessed Dec. 18, 2007.

WizTom for Centura, MQizTom, www.wizart.com/en/products/windows/wiztom_for_gupta.pdf, accessed Apr. 29, 2013 via archive.org, http//web.archive.org/web/20061109154915/http://www.wizart.com/en/products/windows/wiztom_for_gupta.pdf.

Localization Processes, Localization Process with WizTom, http://www.wizart.com/en/downloads/ppt/localization...process.ppt, accessed Apr. 29, 2013, via archive.org, http://www.wizart.com/en/downloads/ppt/localization_process.ppt.

WizTom for the Web, 2006 WizArt Software, http://www.wizart.com/en/products/web/wiztom_for_the_web.shtml, accessed Apr. 29, 2013, via archive.org, http://web.archive.org/web/20070216231303/http://www.wizart.com/en/products/web/wiztom_for_the_web.shtml.

WorldLingo, Instant Website Translator, 2007 WorldLingo Translations LLC, http://ww.worldlingo.com/en/products/instant_website_translator.html, accessed Apr. 29, 2013, via archive.org, http://web.archive.org/web/20070627072457/http://www.worldlingo.com/en/products/instant_website_translator.html.

Ini Translation Utility for Windows, Version: 3.1, http:www.hexagora.com/en_dw_initu.asp; accessed Apr. 29, 2013, via archive.org, http://web.archive.org/web/20120920072845/http://www.hexagora.com/en_dw_initu.asp.

Dynamic HTML Editor, Version 3.x for Windows Platforms, Copyright Jul. 2003, http://www.hexagora.com/en_home.asp.

* cited by examiner

```
<html> <title>This is here $$</title>                    /—300
<body><form>
<input type="text" name="foo" value="f-o-o">
<input type="submit" name="bar" value="Hello">
</form></body>
</html>
```

FIG. 3

| f-o-o | Hello |

```
<html language="piglatin">
<title>Isthay isay erehay</title>
<body><form>                                              /—500
<input type="text" name="foo" value="f-o-o">
<input type="submit" name="bar" value="Ellohay">
<input type="hidden" name="__fxtw_param[1]" value="bar">
<input type="hidden" name="__fxtw_from[1]" value="Ellohay">
<input type="hidden" name="__fxtw_to[1]" value="Hello">
</form></body>
</html>
```

FIG. 5

| f-o-o | Ellohay |

METHOD AND SYSTEM FOR PROVIDING TRANSLATED DYNAMIC WEB PAGE CONTENT

FIELD

Embodiments described herein relate to a method and system for providing translated dynamic Web page content.

BACKGROUND

Websites with static content, or static Web pages, are easy to translate into a foreign language, as may be desirable when localizing the Web site for display in a foreign country or to a linguistically-distinct sub-market. The content that the user will view is easy to collect for translation; since the content does not change it is simple to go to a page and copy the content. It is easy to present once translated; the user is redirected to a page with the translated content. However, websites with dynamic Web pages, i.e., Web pages with dynamically-generated content, present a greater challenge. The content the user will view varies depending on the user's actions. Often content that should be translated (such as text-based instructions) is mixed with content that should not be translated (such as product names).

A typical e-commerce Web site makes extensive use of dynamically-generated content. Consider, for example, a Web site that provides financial services such as Internet banking, i.e., services that enable banking transactions, bill payments, and the like over the Internet through, for example, a financial institution's secure web site. Any page on the site might present many different permutations of text and other content, depending on the configuration options selected by the financial institution and its customers, the end users, the end user's permissions, the end user's accounts, the application in use, and the end user's actions (including making errors). The challenge in translating the dynamically-generated content into a different language is to find all the different permutations of content that could be presented to the user, translate it accurately, and then provide the translated text appropriately.

One possible solution is to use automatic translation (or machine translation) programs. The page with dynamic text, once generated, could be passed through such a translator. However, the automatic translators known in the art have known shortcomings. While automatic translators are sometimes good enough to extract the sense of a page, if all of the source text has only one possible translation and there are no colloquialisms, automatic translations of more complex content are often confusing or ungrammatical, and sometimes incorrect. In addition, automatic translation cannot recognize specific content that should be translated in a specific way or content that should be neither translated nor stored. Automatic translation programs therefore are not preferred for real-time translation of content where accuracy and clarity are important considerations, such as in Internet banking applications.

Other concerns surface in connection with the process of collecting text for translation and maintaining or updating the database of translated text. It is possible, for example, to collect some portion of the Web site content during development mode, either by batch scanning static source code or object code files, or by intentionally viewing individual Web pages to identify translatable content. However, this process is time-consuming, cumbersome and is unlikely to capture all possible permutations of Web content on highly dynamic Web sites.

Additional concerns arise in connection with user flexibility and security. For example, many Web pages will contain some content that should be translated (e.g., the instructions on a data input page) and some content that should not be translated. Sometimes content should not be translated because it is the end user's own words. In an Internet banking checking application, for example, the end user's description of the payee and memo for a particular check are the end user's own words and should not be translated. Sometimes the content should not even be collected for translation, because the data may be confidential or proprietary and therefore should not be stored in a potentially-insecure database or exposed to 3rd-party contractors such as translators. Data such as account numbers and social security numbers fall into this category.

SUMMARY

Disclosed here is an embodiment of a translation server system comprising a Web server, an application database, a phrasebook, and an application server that accesses the application database and serves applications. The phrasebook includes a plurality of source phrases in the source natural language dialect, such as, for example, English, and corresponding translated phrases in a first target dialect, such as, for example, Spanish. In response to a content-request received by the Web server, the application server generates a dynamic Web page content comprising a first source phrase. The application server also includes a translation engine that is designed and configured to replace the first source phrase with a corresponding translated phrase in the first target dialect.

Also disclosed is an exemplary embodiment of a method for generating translated dynamic Web page content. The method includes the steps of storing source phrases in the source natural language dialect along with corresponding translations of the source phrases in a target dialect. The method further includes providing an application server which responds to a Web page request by generating dynamic Web page content in the source natural language dialect, including a first source phrase, and which also replaces the first source phrase in the dynamic Web page content with the corresponding translated phrase in the target dialect. Also disclosed is a computer-readable storage medium comprising instructions for performing the steps of the foregoing methods.

Other disclosed embodiments provide for storage of translated phrases in a second dialect as well, so that the first source phrase may be translated into the target dialect and a second source phrase may be translated into the second dialect. Yet another embodiment is disclosed in which non-translatable components of the dynamic Web page content are left intact.

Also disclosed here is an embodiment of a system for collecting translatable dynamic Web page content. The system, in an exemplary embodiment, includes a Web server, an application server, and a database. The database includes a plurality of source phrases in a source natural language dialect and translated phrases. The application server is designed and configured to generate a dynamic Web page in response to a Web page request received by the Web server, the dynamic Web page including one or more phrases in the source natural language dialect. The application server is further designed and configured to identify a candidate phrase within the dynamic Web page for translation and to add a translatable component of the candidate phrase to the plurality of source phrases in the database.

Also disclosed is an embodiment of an exemplary method for maintaining a database of translated content, the steps of which include storing in a database a plurality of source phrases in a source natural language dialect and a plurality of translated phrases in a first target dialect. A further step includes providing an application server that provides application services comprising generating a dynamic Web page content including one or more phrases in the source natural language dialect. A candidate phrase within the dynamic Web content is identified by the application server and the application server adds a translatable component of the candidate phrase to the plurality of source phrases in the database. A further step includes adding a translation of the translatable component to the plurality of translated phrases in the database. Also disclosed are embodiments of the system and method in which non-translatable component of the candidate phrase is omitted when the translatable component is added to the plurality of source phrases, and in which candidate phrases are identified in the background, or automatically while the application server is processing requests for services.

BRIEF DESCRIPTION OF THE DRAWINGS

FIG. 3 depicts the HTML source code for an exemplary input Web page in English.

FIG. 4 depicts Web page view of the HTML code shown in FIG. 3.

FIG. 5 depicts the HTML source code for a version of the Web page shown in FIG. 4 translated into Pig Latin.

FIG. 6 depicts Web page view of the HTML code shown in FIG. 5.

DETAILED DESCRIPTION OF PREFERRED EMBODIMENT

Figure 1:
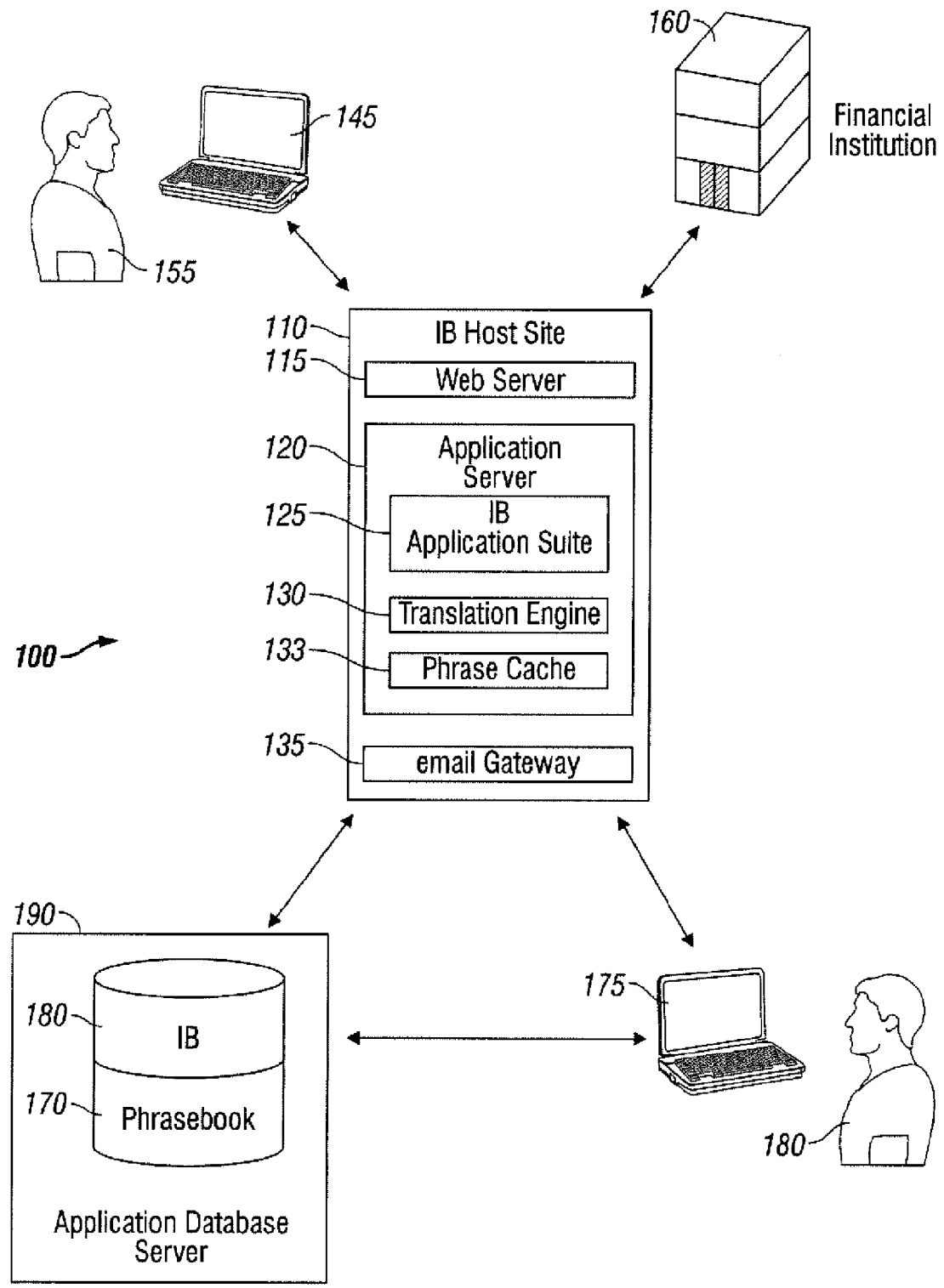
FIG. 1 depicts a high level view of a system for providing translated dynamic Web page content according to an embodiment.

FIG. 1 illustrates an example of a system environment in which embodiments of the invention may be implemented. The system environment is exemplary only and is not intended to suggest any limitation as to the scope of use or functionality of the invention. Embodiments of the invention are operational with numerous other general purpose or special purpose computing system environments or configurations. Examples of well-known computing systems, environments, and/or configurations that may be suitable for use with embodiments of the invention include, but are not limited to, server computers, personal computers, hand-held or laptop devices, multiprocessor systems, microprocessor-based systems, set top boxes, programmable consumer electronics, network PCs, workstations, minicomputers, mainframe computers, telephony systems, distributed computing environments that include any of the above systems or devices, and the like.

Embodiments of the invention may be described in the general context of computer-executable instructions, such as program modules, being executed by a computer. Generally, program modules include routines, programs, objects, components, data structures, and the like. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 1 depicts a high level view of a system 100 for generating and serving translated dynamic, collecting translatable dynamic Web page content and maintaining a database of translated content in the context of an exemplary Internet banking (IB) application. Those of skill in the art will recognize that the systems and methods described herein may be implemented to advantage in any number of other Web-based or other applications.

At least three parties will be involved in an exemplary IB transaction: a financial institution ("FI") such as a bank or a credit union, a host entity that hosts an IB site for the financial institution, and a customer of the financial institution (also referred to as an "end user") who uses the financial institution's IB services. Those of skill in the art will recognize that the host entity might host IB sites for multiple financial institutions simultaneously, or that a financial entity could host its own IB site. Exemplary embodiments of IB services include Assignee's fxeBanking$^{SM}$ and fxBusiness Banking$^{SM}$ products.

FIG. 1 shows financial institution 160, end user 155, a customer of financial institution 160, and an IB host site 110. End user 155 accesses IB host site 110 via a wide area network (WAN) (such as the Internet), a local area network (LAN) or any other system of internetworked computers, from a browser (or similar tool) at remote site 145 which preferably is a personal computer with an Internet connection but can be any other device capable of remotely accessing host site 110, including a computer coupled to a local area network, a dumb terminal, web appliance, cell phone, Blackberry™ or personal digital assistant (PDA). Not shown in FIG. 1 are architectural features such as routers or firewalls around IB host site 110 or the architecture of the interconnection between IB host site 110 and the data and other systems of financial institution 160.

IB Host site 110 preferably is implemented as a general-purpose computing device in the form of a computer including but not limited to a processing unit, a system memory comprising computer storage media, a system bus that couples various system components including the system memory to the processing unit. The computer typically includes a variety of computer readable media. Computer readable media can be any available media that can be accessed by computer and includes both volatile and nonvolatile media, removable and non-removable media. By way of example, and not limitation, computer readable media may comprise computer storage media and communication media. The phrase "computer storage media" is intended to include both volatile and nonvolatile, removable and non-removable media implemented in any method or technology for storage of information such as computer readable instructions, data structures, program modules or other data. Computer storage media includes, but is not limited to, RAM, ROM, EEPROM, USB drives, memory sticks, flash memory or other memory technology, CD-ROM, digital versatile disks (DVD) or other optical disk storage, magnetic cassettes, magnetic tape, hard disks, magnetic disk storage or other magnetic storage devices, or any other medium which can be used to store the desired information and which can be accessed by the computer. The term "communication media" typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. The computer readable media discussed above provide storage of software, computer readable instructions, data structures, program modules and other data for the computer, including an operating system, application programs, other program modules and program data. The computer preferably operates in a networked environment using logical connections to one or more remote computers, which may be, by way of example, a server, a router, a network PC, personal computer, workstation, a hand-held device, a peer device or other common network node. In a networked environment, program modules depicted relative to the computer, or portions thereof; may be stored on one or more remote computers.

IB host site 110 includes web server 115, application server 120, and email gateway 135. Preferably IB host site 110 runs the Linux or Unix operating system.

Web server 115 receives requests for Web-based IB services from user 155 at remote site 145 and responds to such requests by delivering Web pages to remote site 145. Preferably Web server 115 comprises one or more Apache Web servers. Those of ordinary skill will appreciate that many other web servers, including but not limited to Microsoft IIS, are equivalent to an Apache web server.

An application server, generally speaking, is a software engine that operates application programs to deliver application services to client computers or devices, often but not always through a LAN or WAN or other network and using the HTTP protocol (or similar protocol), and is often used to refer to servers of Web-based applications such as integrated platforms for e-commerce. An application server typically provides business logic application (or applications) and often will be combined with a front end Web server and a back end database server or other system. In a typical embodiment, a request for dynamic content is received by a Web server and is transmitted by the Web server to the application server, which queries the backend database server or system to obtain data with which to generate the requested dynamic content. An application server can include CGI (Common Gateway Interface), PHP, or FastCGI programs served by a web server such as Apache or Microsoft IIS. A non-exhaustive list of other application servers includes Java Platform—Enterprise Edition or Java EE 5 application servers such as Weblogic Server (BEA), Websphere (IBM), JBoss (RedHat), and Sun Java Application Server (Sun), Tomcat (Apache Foundation), and the Windows .NET platform (Microsoft).

In an embodiment depicted in FIG. 1, application server 120 hosts applications providing financial services, including IB application suite 125. Preferably IB application suite 125 comprises one or more of the following financial services: Internet banking, bill payment, bill presentment, cash management for commercial accounts, personal finance management, and account alerts. The components of the exemplary IB application suite 125 are encoded in Perl modules executed by a Perl virtual machine and invoked by web server 115 as FastCGI applications. Application server 120 works with web server 115, IB database server 190 (which hosts IB database 180 used by the IB application suite), and links to the data and other systems of financial institution 160 to provide IB services via a Web-based interface to customer 155 of financial institution 160.

In an embodiment, application server 120 can be hosted on the same physical machine as web server 115, either in the same process space or in a different process space. Preferably there are provided multiple essentially-identical machines, each provided with essentially identical versions of Web server 115 and application server 120 and in communication with application database server 190, all interoperable to respond to requests directed to IB host site 110 in a manner known to those of skill in the art to enhance performance, reliability and scalability. In an alternative embodiment, application server 120 can be hosted in whole or in part on a different computer or a network of computers from the computer or computers that host web server 115.

In an embodiment application server 120 includes Translation Engine 130 as an integral part of the IB application suite 125 and thereby capable of invoking, and being invoked by, other IB application components. Translation Engine 130 preferably is coded in Perl modules and executed by the same Perl virtual machine on the same computer and in the same process space as the other components of IB application suite 125. Application server 120 also preferably includes phrase cache 133 implemented in computer storage media, such as by way of example RAM or a hard drive, and configured as a cache as known to those of skill in the art.

Those of skill in the art will recognize that Translation Engine 130 in an alternative embodiment can be implemented as a proxy server interposed between IB host site 110 and remote site 145 and designed and configured to intercept and translate the dynamic Web pages returned by Web server 115. However, implementing translation engine 130 as a proxy server interposed between remote site 145 and Web server 115 creates a "man in the middle" configuration with weakened or unpredictable authentication checking and other security measures. This embodiment thus may not be suitable for applications with high security requirements such as Internet banking.

IB host site 110 also includes email gateway 135, which among other things enables application components in application server 120 to serve automated email notices and warnings.

IB database 180 contains tables and other database structures and data used by IB application suite 125. In an embodiment application database server 190 also hosts phrasebook database 170, which stores source dialect phrases, corresponding target dialect phrases, and other information for use by Translation Engine 130. In an embodiment all the tables and other database structures of phrasebook database 170 are included in the same logical database as IB database 180. In an alternative embodiment, IB database 180 and phrasebook database 170 are different logical databases. Preferably IB database 180 and phrasebook database 170 are an Oracle relational database and are accessed via conventional SQL calls. The physical components of IB database 180 and phrasebook database 170 can be hosted on one or more server machines, or even on the same machine as IB host site 110, in a manner known to those of skill in the art.

Preferably Phrasebook database 170 can be maintained (including, for example, administered, backed up, corrected, updated, augmented, supplemented and modified). FIG. 1 depicts a human translator 180 at translation site 175, where translation site 175 includes a workstation or other computer with access to application database server 190 for maintenance of phrasebook database 170. Preferably application database server 190 is designed and configured, as is known to those of skill in the art, to permit live maintenance of the production version of phrasebook database 170 and IB database 180, i.e., maintenance of the live versions of phrasebook database 170 and IB database 180 can per performed during operation of application server 120 without the necessity of re-building or relinking any application or database components or stopping and restarting application server 120 or application database server 190, so that new or additional translated phrases can be made available to the translation engine 130 and application server 120 immediately after translation is completed.

In the embodiment disclosed herein the content is translated from one natural language, called the source language or source dialect, e.g., English, to another natural language, called the target dialect, e.g., Spanish.

Phrasebook database 170 stores all phrases that can appear on the Web site in the source dialect, e.g. English. In an embodiment, phrases are the basic units of text that are pulled from the website and translated. A phrase can be as short as one word or as long as a disclosure form that fills an entire Web page—it is simply a whole section of text or other content that is ended by anything that should not be translated. Preferably, most of the phrases will be a syntactic unit (such as a sentence, a sentence fragment or a collection of sentences) larger than a word. The phrasebook contains all of the text or other content that should have a translation.

Phrasebook database 170 also includes corresponding phrases that have been translated into one or more target dialects. Each phrase preferably is translated by a human translator. Although machine translation or other translation tools may be used during the translation process, the final translation preferably will be approved by a human translator before the translated phrase is added to phrasebook database 170.

Those of ordinary skill in the art will also recognize that the database can store other forms of content in source and target languages in like manner, including but not limited to static content such as audio files, pdf files, graphic images and video images. Similarly, some forms of Web content, such as hyperlinks or ftp requests to a URI, in an embodiment, may be translated literally or may be translated by redirection to an alternate URI corresponding to content in the desired target dialect.

Translation Process

In an embodiment the logic and source code of the underlying application has been modified or otherwise adapted to invoke translation engine 130 at key points in the process and to provide additional processing, depending on the requirements of the application logic, for specific types of content. In an overview of an embodiment, the process is initiated when a user (or a financial institution) who has chosen a language other than English requests a service from an application served by application server 120 by submitting a Web request. The application server generates a dynamic Web page in response to the Web request and then invokes translation engine 130, which examines the page for translatable phrases (that is, pieces of text or other content). For each phrase it finds, it checks to see if that phrase is already included in phrasebook database 170. If translation engine 130 finds the phrase in phrasebook database 170, it finds the corresponding translation in the phrasebook database and displays the translated phrase to the user on the appropriate place on the page. If the English phrase is not found, or if there is no corresponding translation, the phrase is collected, meaning that it is stored in the phrasebook database 170 and marked for translation. The process is fast enough that it works seamlessly for the user.

Figure 2:
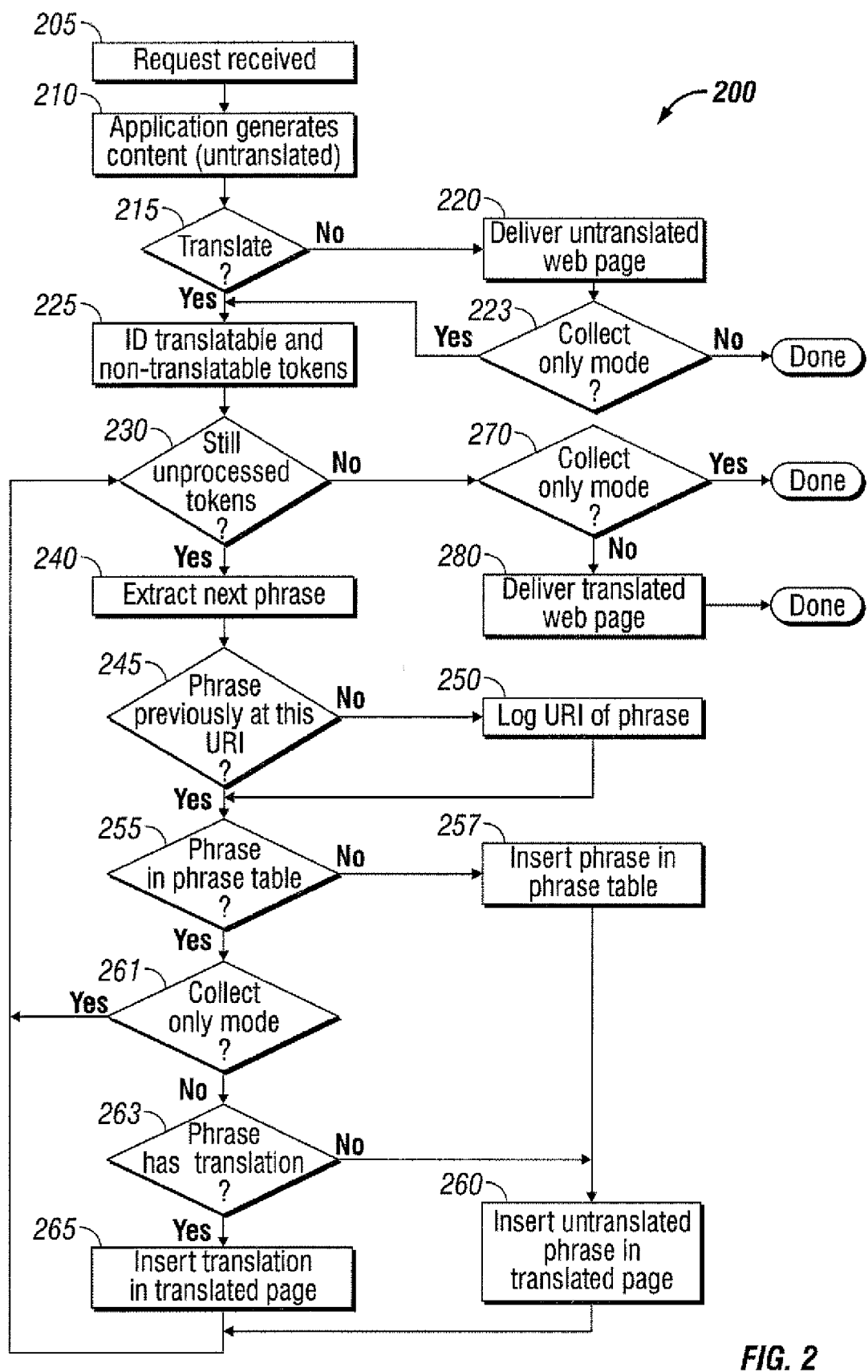
FIG. 2 depicts the steps of a method for providing translated dynamic Web page content according to an embodiment.

FIG. 2 depicts the steps of an exemplary method for collecting and providing translated dynamic Web page content. Preferably a markup language such as HTML is used to describe structure, layout, source, format, and other information regarding the Web page content.

Step 205: The translation process starts when a request for financial services such as, for example, IB services, is submitted by user 155 using a Web browser or similar tool at a remote site 145 and received by Web server 115 at IB Host Site 110. Preferably the request conforms to the HTTP protocol and includes an HTTP method and a URI (Uniform Resource Identifier) identifying the resource to be retrieved or manipulated. In a manner known to those of skill in the art, the URI will include information identifying the request as requiring generation of dynamic Web page content (or dynamic content) such as a CGI or Fast CGI request, for example, and Web server 115 will transfer the request to the IB Application Suite 125 in Application Server 120 to perform the method in the request. As part of the initial setup process, IB application suite 125 is adapted to invoke Translation Engine 130 to translate the request. Translation Engine 130 first checks CGI environment variables (such as language), session data, and end user and financial institution settings to see whether translation and/or collection have been turned on. If so certain environment variables are defined to indicate to Translation Engine 130 and to other components of the IB application suite that translation and/or collection is desired.

Before returning control to the application, Translation Engine 130 translates the request instructions and data in the form back into English (the source dialect) by extracting request data in English from "hidden" HTML tags embedded in the request page. The request for a dynamic Web page is contained in an HTML form in which all translatable content has been previously translated into a target dialect such as Spanish. When the HTML form in the Web page request was initially translated, some of the HTML elements containing instructions or data (such as, for example, HTML <input> and <select> tags) were given translated values for display, and corresponding "hidden" <input> elements were inserted to provide translation engine 130 some context to translate those translated values back to the English (source dialect) values expected by the application.

For example, suppose the English (source dialect) form contained "Enter" as the value of the submit <input> tag, and that when this particular Web page was translated into Spanish this value was translated to the word "Entrar." Thus the request, when submitted to the application, will contain the translated word "Entrar" as the value of the <input> tag. However, this presents a potentially serious problem if the application logic expects an English word as the value of the <input> tag, e.g., if the program logic requires "$cgi->param ('submit') eq 'Enter'" to trigger the desired behavior. Without additional instructions, the program logic in the application would not understand the request data and would reject the request or commit or return an error. Accordingly, during the translation phase of the response, the translation engine will also store "hidden"<input> tags to indicate that "submit=Entrar" should be mapped back to "submit=Enter" during request translation.

FIGS. 3 through 6 illustrate the use of "hidden" fields. FIG. 3 shows the HTML code for the English (source dialect) version of an exemplary Web page, and FIG. 5 shows the HTML code for a version of the Web page that has been translated into a target dialect of Pig Latin. FIGS. 4 and 6 show, respectively, how the Web pages are displayed by a browser. The value "f-o-o" of the "text" <input> tag has not been translated. However the "Hello" value of the "submit" <input> tag has been translated into "Ellohay." During the translation of the response, three additional "hidden" <input> tags, identifying 'param', 'from', and 'to' for each translated name/value tag, were inserted into the HTML code. (As can be seen in FIG. 6, the "hidden" values do not display). When the request is translated (in step 205), Translation Engine 130 interprets the "hidden" <input> tags as instructions to translate any "bar" parameter whose value is equal to "Ellohay" (target dialect) to "Hello" (source dialect) within the input request before further processing of the request.

Step 210 (of FIG. 2): After receipt and initial processing of the request in step 205, Translation Engine 130 returns control to the IB application, which does whatever processing it needs to generate the HTML code for the Web page response to the request. This web page response will be in English, the source dialect, and in most instances will be a dynamic Web page. In an embodiment the application logic and source code in the application has been adapted so that (if collection or translation has been requested) HTML processing directives can be added to fields and phrases in the HTML code in the Web page response to identify untranslatable or otherwise sensitive content that should not be collected or translated.

Steps 215, 220 and 223: Control returns to Translation Engine 130 after the application has generated a complete Web page response to the request in the source dialect (English). Translation Engine 130 checks the environment and configuration variables to see whether collection or translation has been requested. In the case where translation has not been requested, the untranslated, i.e., source dialect, Web page response is delivered to the Web server to return to the remote site 145 (step 220). In step 223, Translation engine 130 checks to see whether it is in collection mode. If it is not in collection mode, it is done with this request.

Step 223 preferably includes additional processing when translation engine 130 is in collection-only mode, i.e. collection is requested but translation has not been requested. When in collection-only mode, translation engine 130 delivers the untranslated Web page response to Web server 115 before conducting collection. In this way translation engine 130 can perform collection in the background without degrading page-load response time or other system performance metrics. However, because HTML processing directives were added in step 210, a copy of the untranslated, i.e., source dialect, Web page response must be made and stripped of the HTML processing codes added in step 210, and it is that copy which is delivered to the Web server to return to the remote site 145 (step 220) when in collection-only mode. Control then passes to step 225 for further processing.

Step 225: The translation process reaches step 225 if translation or collection has been requested. Here begins the process of building a translated Web page by replacing HTML code in the Web page response with translatable content with equivalent HTML code with translated content, i.e., content that has been translated into the desired target dialect. In step 225 the content of the Web page response is parsed into translatable and non-translatable tokens based on the HTML processing directives added in Step 210. In an embodiment, non-translatable tokens are content that translation engine 130 is configured to ignore, not collect, or not translate, such as phrases comprising sensitive content; and all other content is translatable. HTML processing directives that identify sensitive or otherwise non-translatable content preferably are removed in this step.

Step 230: In step 230, translation engine 130 checks to see whether there remain any unprocessed tokens in the content of the Web page response. A token will include all contiguous text (or other strongly-correlated content) between two HTML tags (or other markers), and can be as small as a single character or a single HTML tag. If there remain no more unprocessed tokens, control passes to step 270. Otherwise, processing will continue as long as there remain unprocessed tokens. Non-translatable tokens identified in step 225 are processed by leaving intact the Web page response content corresponding to the non-translatable token in the Web page. The processing of translatable tokens begins in step 240.

Step 240: In step 240, a tokenizer will extract the next translatable phrase from the tokens in the content of the Web page response. The tokenizer preferably is an HTML parser such as HTTP::TokeParser adapted for Perl applications. In an embodiment the tokenizer will parse tokens into phrases according to the following exemplary guidelines and rules. Starting sequentially from the current token, the tokenizer will break, i.e., identify a phrase, when it encounters an HTML tag. Some HTML elements or tags are recognized as translation phrase separators, e.g., tags for paragraph, input, table data, image. Other HTML tags are recognized as "sticky," meaning that the tag should be included in the phrase and the tokenizer will not break when it sees the tag but will incorporate the tag into the phrase. Sticky HTML tags include tags for character format (bold, italic, font), list tags (list, definition list, definition description), and tags that identify a block for uniform formatting or emphasis (emphasis, strong, span, and header tags). Sticky tags will be ignored if they are at the start and end of what is otherwise a phrase or if there is no closing match for a leading or trailing sticky tag. Thus, source content such as "Hi <b>Bob</b>, how are you?" would be collected as "Hi <b>Bob</b>, how are you?"; but "<b>Hi, Bob, how are you?</b>" and "<b>Hi Bob, how are you?" would each be collected as "Hi Bob, how are you?". White space is normalized and tokens that are not regular expressions are ignored. Source content surrounded by start and end script tags would be collected as a single phrase, thereby allowing translation of content expressed in a scripting language such as, by way of example, Javascript. Image attributes (source, alt, title) are expressly collected for translation. Translation of an image file can be accomplished, for example, by substituting an image file where the text is in a target dialect for an image file where the text is in the source dialect.

White space content preferably is normalized, or converted to a canonical form, to minimize potentially subtle differences between otherwise identical phrases while maintaining new-line and paragraph breaks in the source content. An exemplary method of normalizing white space includes the following: strip leading spaces and trailing spaces; map tabs or multiple spaces to a single space; strip trailing spaces on each line; convert line-ending characters to a single-byte new line character; strip leading spaces on each line; and, collapse multiple blank lines into a single blank line. Preferably the same method is used during collection of phrases for translation.

Steps 245 and 250: In step 245 translation engine 130 searches the phrases associated with the current context, including the current URI, to see if the phrase has been previously associated with the current URI. If not, in step 250 the URI of the phrase is logged.

Steps 255, 257, and 261: In step 255, the phrase table in phrasebook database 170 is searched to find a match to the current phrase. The order of searching is determined by what dialects have been selected, if any. The search process is described in more detail below, and preferably includes the step of searching a cache of phrases. If no matching phrases are found in the phrase table in phrasebook database 170, the phrase is collected by inserting the untranslated (source dialect) phrase into the phrasebook database 170 and marking it for translation at step 257. Control then passes to step 260. If a match is found, control passes to step 261, where it is determined whether translation engine 130 is in translation mode or collection-only mode. If in collection-only mode, there is nothing to collect on the current phrase, since it matches a phrase already in the phrase table for the current context, and control returns to step 230 to begin processing the next translatable tokens. If in translation mode, control passes to step 263.

Steps 263 and 265: Step 263 is reached when the current phrase is matched to a source dialect phrase in the phrase table in phrasebook database 170 and translation engine 130 is in translation mode. If there is a corresponding entry in the translation table in phrasebook database 170 for the selected dialect, the corresponding entry is the translation into the target dialect; and in step 265 the translated content in the translation table is inserted into the proper place into the translated Web page and control passes to step 230 to begin processing the next translatable token. If there is no corresponding entry in the translation table in phrasebook database 170 (as might occur if the phrase had been recently collected for translation but had not yet been translated), control passes to step 260.

Step 260 is reached when translation engine 130 has collected a phrase that was not previously in the phrase table or that lacked a corresponding entry in the target dialect translation table. The untranslated English (source dialect) phrase is inserted into the translated Web page. If the Web page response includes input fields, special instructions, preferably "hidden" HTML tags, are inserted into the Web page response so that the critical information in the request page is captured in the source dialect. The untranslated phrases identified during processing are flagged for translation. Preferably translation engine 130 is configured to provide notification that untranslated translatable phrases have been collected and require translation by, in an embodiment, sending an email or other notification via email gateway 135 or other communication protocol to human translator 180 or translation site 175 to enable prompt updating of phrasebook database 170 with translations of the collected phrases. Collected content and corresponding translations are preferably exchanged with human translator 180 in the Translation Memory Exchange XML format or similar format.

Control passes to step 270 after it is determined in step 230 that there are no more unprocessed tokens. In step 270 it is determined whether translation engine 130 is in collection-only mode or in translation mode. If translation engine 130 is in translation mode, control passes to step 280, where the translated Web page (i.e., in target dialect) is delivered preferably to Web server 115 for transmission to remote site 145, and translation engine 130 is done processing the request. If translation engine 130 is in collection-only mode, it is done processing the request, as all content has been collected.

Search Order for Translations.

When translation or collection have been turned on, translation engine 130 examines each page for phrases as the page is loaded. Every time it finds a phrase, the system looks for that phrase in the phrase table in phrasebook database 170. Spaces and carriage returns at the beginning or end of text are not considered part of the phrase. If an exact match for the phrase is found, translation engine 130 then looks for the translation in the translation table in phrasebook database 170. If the financial institution has multiple dialects, the search order for translations follows a dialect cascade, i.e., the dialects are checked in the order designated when the language was created. If an exact match for the phrase is not found, translation engine 130 then examines the pattern requests for a match.

In an embodiment caching techniques and context mappings can be used to improve performance. The context of the phrase includes the URL containing the phrase and the application. Phrasebook database 170 includes a context_to_phrase table containing mappings of context to phrases and patterns. When matching a phrase, translation engine 130 first searches all the phrases in phrasebook database 170 in the current context, and then all patterns in the current context if there is no matching phrase. If not found within the current context, then all phrases in the same application are searched, and then all patterns in the same application. If a match is found, the context_to_phrase table is updated. If the phrase is still not found, the phrase is collected for translation. Preferably phrase cache 133 is automatically populated with all phrases and patterns for the current context for faster search and identification of previously-translated phrases.

Search Order—Multiple Target Dialects

Dialects are variants of translations, which may correspond, in an embodiment, to regional or corporate differences among the financial institutions. A base dialect is a default or fall-back set of translations in the phrasebook. In an embodiment, if the Web pages are translated into Spanish, the translation can be saved as a dialect named Spanish. A language is an ordered (or nested) series of one or more dialects. The simplest case is the language comprising a single base dialect.

Multiple dialects can be used to customize translation for a particular end user or financial institution. For example, a financial institution might want a dialect specific to the financial institution to synchronize translation choices for specific banking terms in the IB application with translation choices the financial institution has previously made for other translated media in other contexts. Dialects could also be used to provide a variant of a language. For example, a financial institution might want to offer a Cuban variant of Spanish. Adding dialects, however, carries a performance penalty, as each additional dialect demands more storage resources and increases set up and maintenance costs such as storage, translation and testing.

Different dialects are stored in tables in phrasebook database 170 with an attribute of "Dialect." Therefore, for any source phrase in the phrase table in phrasebook database 170, there may be multiple translated versions of the source phrase, each in a different target dialect, stored in the translation table in phrasebook database 170, each having an attribute identifying it as part of a specific dialect. The translate_lang_to_dia table in phrasebook database 170 keeps track of the relationship between the different dialects.

Example—One Dialect Language. A financial institution may choose to offer the base dialect Spanish, consisting only of the translations in the dialect Spanish, with no variations.

Example—Two Dialect Language. Suppose First National, a hypothetical financial institution, has already translated printed media into Spanish, and has chosen to translate the "Effective Date" of transfers as "Fecha de Vigencia," but the basic Spanish dialect uses "Fecha Eficaz" instead, and First National wants its IB applications to match the printed media. A dialect can be created that includes just the phrases with "effective date" in them and name it FirstNational, after the financial institution. First National could then use the Spanish language that consists of first the dialect FirstNational and then the dialect Spanish. That is, First National can configure the IB application so that, when searching phrasebook database 170 for the translation corresponding to a particular phrase, translation engine 130 first searches for corresponding translations with the FirstNational dialect attribute. If and only if there are no corresponding translations with the FirstNational dialect attribute, translation engine 130 would then search for corresponding translations with the Spanish base dialect attribute.

Example—Three Dialect Language. Further, if the hypothetical financial institution First National wants to offer a Cuban variant of Spanish, a Cuban dialect can be created consisting of phrases where the Cuban Spanish translation differs from the Spanish translation already in included in the base Spanish dialect translations in phrasebook database 170. First National could then determine the search order for the translations. For example, First National can configure the IB application so that translation engine 130 searches the translation table first for corresponding translations in the dialect FirstNational, then the dialect Cuban, and finally the base dialect Spanish.

In addition to ordered (or nested) dialects, phrasebook database 170 can also be configured to store translations for altogether different languages, such as, for example, Spanish (and dialects thereof) as one language, and French (and dialects thereof) as another language.

Search Order—Pattern Requests

If the exact phrase is not found in any dialect in the phrasebook, translation engine 130 looks for a matching pattern. Patterns allow larger phrases to be extracted and translated, while allowing mini-phrases within them to be handled separately. A word or small phrase that should not be translated, or that must be translated a particular way, is marked as a pattern within the larger phrase within the phrasebook. If translation engine 130 cannot find an exact match in the phrasebook for the phrase it is translating, it checks the patterns. For example, if translation engine 130 searches for "Welcome to City National Bank" and does not find it, it then searches the patterns for a close match. In an embodiment it might find "Welcome to %[institution_name]" (which tells it to search the phrasebook separately for the text contained within the brackets) or "Welcome to %{institution_name}" (which tells it not to translate the text contained with the curly brackets). If translation engine 130 finds a pattern, it searches for a matching translation in the translation tables in phrasebook database 170, following the appropriate dialect cascade.

The process of translation is invisible to the user. Once a target dialect is selected (preferably by the end user or the financial institution), all appropriate translatable text appears in that language. For example, all on-screen instructions, online help, calendars, table headings, links, drop-down menus, error messages, disclosures and product descriptions will translated into the target dialect when the Web page is returned to the end user.

Non-Translatable Components and Security Measures.

Content (tokens or phrases) can be identified as non-translatable to ensure special handling. For example, content entered by an end user or financial institution (like transaction descriptions or in-session messages) preferably should not be translated. Neither should customer names or product names (like "Savings Bond"), These types of phrases preferably are marked in the code (e.g., by surrounding with markup processing tags) before text collection has begun so that the phrases are not collected (i.e. not added to phrasebook database 170) and are not translated by translation engine 130.

The translation mechanisms and related processes are also affected by security concerns such as preventing the wrong people from seeing sensitive content, and preventing the wrong people from entering malicious translations. The "wrong people" could include operators who are glancing through the database tables who may not have need to know sensitive content like social security numbers, credit card numbers, addresses, phone numbers, etc., or the human, 3rd-party contractors who are assigned to translate the source dialect to a target dialect. Such sensitive content is preferably non-translatable.

"Malicious translations" might include any text which might affect the dignity of the party sponsoring the application, for example, curse words or other kinds of textual graffiti. Exemplary techniques to prevent the retrieval, transmission or exchange, and long-term persistence of sensitive content preferably include the following.

First, an export which is constructed for human translators can be manually reviewed for any sensitive or otherwise non-translatable content before being exchanged for translation or other processing.

Second, specific HTML processing tags preferably are used to signal translation engine 130 to avoid collecting any untranslated or clear content between the HTML processing tags for storage in the phrase table; and the application logic and source code is adapted add the specific HTML processing tags to regions of HTML where such sensitive or otherwise non-translatable content is expected to be. In an embodiment, <?literal?> and <?end-literal?> markup processing tags indicate content that should be neither collected nor translated; and these markup processing tags are removed during collection or translation and are not intended to be output to the user's browser. Accordingly, the markup source code which produces the description of a translation might be changed (for example, by a programmer) from "<td>[+ $acct_data->{desc} +]</td>" to "<td><?literal?>[+ $acct_data->{desc} +]<?end-literal?></td>" to generate pre-processed (i.e., pre-collection or pre-translation) HTML such as, for example, "<td><?literal?>Deposit from Chase Bank<?end-literal?><td>." When translated, the content within the <?literal?> tags would be rendered without translation.

Third, the applications in an embodiment can be equipped with custom tag libraries which have been retro-fitted to predict when HTML is constructed to contain sensitive or otherwise non-translatable content and to automatically incorporate these HTML processing tags. In an embodiment, all custom tags associated with free-form text input fields are automatically treated as sensitive when collection/translation is detected. The tags <MICdefine> and </MICDefine> are custom tags in an embodiment of an application, and the source code in the application that processes the custom tags can be modified to add additional processing associated with these custom tags. To illustrate, consider an exemplary application environment in which translation is enabled and which contains the following fieldspace definition: "<MICdefine name="foo"> $field->set_value('bar'); </MICdefine>." An exemplary Form page with HTML code "<MICinput name="foo">" would render, in pre-processed html, "<?literal?><input type="text" name="foo" value="bar"><?end-literal?>." The result page corresponding to the exemplary form page would render "<MICdisplay name="foo">" in pre-processed HTML as "<?literal?>bar<?end-literal?>."

Sensitive or otherwise non-translatable content encountered during the collection process can be preferably omitted from phrasebook database 170, and thereby protected from collection and translation in an embodiment, by numerous means, including ignoring the content during processing, stripping the non-translatable content from the source phrase, or sanitizing the non-translatable content by replacing it with content-neutral text such as, for example, replacing numbers and letters in the sensitive content with concealing symbols such as "#" and "x" before storing the source phrase in phrasebook database 170.

Structure of Phrasebook Database

Phrasebook database 170 in an embodiment includes the following tables:

Table name: context. The context table contains a description of a location where phrases were found, including an "application" and a "path". An "application" need not refer to one and only one application. For example, one "application" can be used for an entire suite of web applications, while two "applications" might cover two different areas within a single web application. "Path" is typically a URL relative to the base URL of the application but can also refer to source file locations or other identifiers unique within the context of that application.

Table name: phrase and phrase_contin. The phrase table stores original English (source dialect) phrases. The "phrase" table contains only the first 4000 bytes of the phrase—if the text contained more than 4000 bytes, then the whole text will be re-written as an Oracle Clob (character large object) in the phrase_contin table. The phrase table also includes "ingore_flags" and "pattern_flags" fields. The value for "ignore_flags" contains an instruction regarding the translation of this phrase: 0=translate this phrase, 1=do not translate this phrase and present as is, 2 do not translate this phrase but present a blank. "pattern_flags" indicates whether this phrase represents a pattern: 0—phrase is not a pattern, 1—phrase is a 'normal' pattern, and 2—phrase is a 'regular expression' pattern.

Table name: context_to_phrase. The context_to_phrase table stores mappings from context to phrase.

Table name: translation and translation_contin. The translation table contains translations associated with phrase entries. The translation and translation_contin tables behave like their phrase counterparts. The translation entry contains only the first 4000 bytes of the translated phrase, and the translation_contin table stores continuation for translations exceeding 4000 chars in length. Additionally, "dialect" can map this translation to a set of variants of a given language.

Table name: capture. The capture table stores whole pre-processed source dialect pages for quality assurance or post-processing.

Table name: Tag tables. The tag table stores names which can be mapped to contexts or phrases. The tag_to_context table stores mappings from tag to context. The tag_to_phrase table stores mappings from tag to phrase. In an embodiment tags can be used for quality assurance or phrase management, for example, to differentiate phrases pending back from the translator from new phrases that have not yet been sent to the translator.

Table name: translate_application. The translate_application table stores Description, CMS entity, and other attributes of translation applications. "CMS" here refers to a capability management system, which is preferably a system for assigning and verifying privileges for all entities registered to the system. In an embodiment, for example, a CMS system is implemented as a SQL database that stores <E,C,T> triplets, where each <E,C,T> triplet associates an entity, a capability, and a target. The CMS system can be used to determine if a translator 180 or a financial institution employee is authorized to view a portion of phrasebook database 170 or to create or change a translation for a particular dialect and application in phrasebook database 170 and, if authorization is lacking, to prohibit such access. The CMS system could be used to implement a dual control requirement for translations, i.e., a requirement for 2d-party (or managerial) approval before a translated phrase is added to the live version of phrasebook database 170. The CMS system could also be used to create a system that would prevent financial institution employees from modifying or adding translations for a base dialect but would permit the financial institution employee to modify or add translations for a dialect used only by the financial institution.

Table name: translate_language. The translate_language table stores description, CMS entity, and other attributes of translation languages.

Table name: translate_dialect: The translate_dialect table stores description, CMS entity, and other attributes of translation dialects.

Table name: translate_ent_to_lang: The translate_ent_to_lang table stores mappings from Institution entities to translate_language.

Table name: translate_lang to_dia: The translate_lang_to_dia table stores mappings from translate_language to translate_dialect.

Those of skill in the art will appreciate that a phrasebook database under another application may organize and store the data in different tables.

Creation and Maintenance of Phrasebook Database

Phrasebook database 170 is initially constructed by a text-collecting software tool which collects all text and other translatable content that appears on the Web site. The phrasebook database also must be initially populated when new pages or features are added. The text is collected in phrases.

Once phrasebook database 170 is populated and in production, it must be maintained by, for example, supplementing the database with translations of untranslated translatable source phrases. Exemplary methods for supplementing the database include the following. The text-collecting software tool can be run every time new features are released, and untranslated translatable phrases are identified and collected for translation. Translation engine 130 can be configured to automatically check for untranslated translatable phrases during normal operation of application server 120. For example, the text-collecting software tool can be configured to automatically scan every $n^{th}$ page (where n can be any number, including 1, i.e., every page, 2, 3, 10, 50, etc.) served from the website for untranslated translatable phrases, which will then be added to phrasebook database 170 and translated.

As discussed above in connection with step 223 of FIG. 2, untranslated phrases can be automatically collected in the background during normal production-mode operation of the applications served by application server 120. In this background collection phase, translation engine 130 can be configured to automatically collect for translation each nth untranslated translatable phrase (where n is preferably 1 but could be any other number such as 2, 3, 10, 50, etc.), in which case the phrase will be added to the phrase tables (e.g., phrase, phrase_contin, and context_to_phrase) in phrasebook database 170 and marked for translation. This automatic background collection can occur in translation mode, i.e., when the application server 120 is delivering translated pages to Web server 115 to return to the remote site 145, or in collection-only mode, when application server 120 is delivering untranslated pages to Web server 115 to return to the remote site 145. Automatic collection in this context means that collection occurs without user selection of content, editing or intervention. When a phrase is collected for translation, the source content of the entire Web page, with hidden parameters purged and sensitive content sanitized, is saved in the capture table.

User Set-Up and Financial Institution Customization

End user 155 can elect a language for his or her interaction within a session. The end user's financial institution preferably decides which sets of dialects to offer their users, and only these sets of dialects chosen by the financial institution are displayed as language options to the user.

Preferably the financial institution can request a specific ordered set of dialects of a language. For example, a financial institution in Florida might want to provide Cuban Spanish. The translation engine 130 will provide the Cuban dialect translation for any phrase that has a corresponding translated phrase in the Cuban dialect; the base dialect Spanish translation will be provided for all other phrases that have no Cuban dialect translation.

Those of skill will recognize that the techniques of the embodiments described herein may be implemented to advantage in a variety of sequential orders and that the present invention may be generally implemented in computer-readable media for introduction into and use in a system for providing translated dynamic Web page content. In such cases, instructions for executing the steps described herein will be embedded in the media.

Although many embodiments have been described in detail, it will be apparent to those skilled in the art that many embodiments taking a variety of specific forms and reflecting changes, substitutions and alterations can be made. The described embodiments illustrate the scope of the claims but do not restrict the scope of the claims.

We claim:

1. A method for generating translated dynamic Web page content, comprising:
   storing, by one or more computers, a plurality of source phrases in a source natural language dialect and a plurality of translated phrases in a phrasebook database, each of the plurality of translated phrases corresponding to a translation into a target dialect of one of the plurality of source phrases;
   receiving, by the one or more computers, dynamic Web page content for Internet banking responsive to a Web page request from a user of a financial institution;
   processing, by the one or more computers, the dynamic Web page content into at least a first token and a second token;
   determining, by the one or more computers, the first token is translatable, wherein the first token comprises a first source phrase;
   determining, by the one or more computers, the second token is non-translatable, wherein the second token comprises a second source phrase;
   determining, by the one or more computers in response to determining the first token is translatable, the first source phrase has a corresponding translated phrase from the plurality of translated phrases in the phrasebook database;
   translating, by the one or more computers, the first token by replacing the first source phrase with the corresponding translated phrase from the plurality of translated phrases in the phrasebook database;
   generating, by the one or more computers, a translated dynamic Web page, wherein the translated dynamic Web page comprises the corresponding translated phrase and the second token comprising the second source phrase;
   determining, by the one or more computers, the second token contains sensitive content based at least in part on the user, and performing security measures by replacing the second token with content-neutral text;
   determining, by the one or more computers, whether the first source phrase is associated with a uniform resource identifier (URI), wherein the URI is associated with the Web page requested by the user;
   associating, by the one or more computers, the first source phrase to the URI if the first source phrase was not associated with the URI;
   determining the target dialect is associated with a target language based at least in part on a location of the financial institution;
   determining a second dialect associated with the target language;
   determining a plurality of second-dialect translated phrases, wherein each of the plurality of second-dialect translated phrases corresponds to a translation into the second dialect of one of the plurality of source phrases;
   determining one or more of the plurality of source phrases having a corresponding target-dialect translated phrase and a corresponding second-dialect translated phrase;
   selecting the corresponding target-dialect translated phrase based on the location of the financial institution;
   selecting the corresponding second-dialect translated phrase when no corresponding target-dialect translated phrase exists; and
   providing the translated dynamic Web page to the user of the financial institution.

2. The method of claim 1 further comprising:
   replacing a third source phrase from a third token processed from the dynamic Web page content with a corresponding one of the plurality of second-dialect translated phrases.

3. The method of claim 1 further comprising leaving intact the second source phrase from the second token processed from the dynamic Web page content.

4. The method of claim 1 further comprising searching a cache comprising a plurality of source phrases associated with a current application context.

5. The method of claim 1 wherein the first source phrase comprises a pattern phrase and a variable component, the pattern phrase having a corresponding translated phrase.

6. The method of claim 5 wherein the variable component has a corresponding translated phrase.

7. The method of claim 1 further comprising:
   identifying within the dynamic Web page content a script phrase comprising source natural language dialect content; and
   replacing the script phrase with a translated script phrase wherein the source natural language dialect content has been translated into the target dialect.

8. A translation server system, comprising:
   a Web server;
   a phrasebook storing a plurality of source phrases in a source natural language dialect, and a plurality of translated phrases, each of the plurality of translated phrases being a translation into a first target dialect of one of the plurality of source phrases;
   an application database server comprising an application database;
   an application server configured to access the application database and to generate a dynamic Web page content for Internet banking in response to a content request from a user of a financial institution, received by the Web server, said dynamic Web page content comprising a first source phrase and a second source phrase;
   the application server further comprising a translation engine configured to:
   process the dynamic Web page content into at least a first token and a second token;
   determine the first token is translatable, wherein the first token comprises the first source phrase;

determine the second token is non-translatable, wherein the second token comprises the second source phrase;

determine, in response to the determination the first token is translatable, the first source phrase has a corresponding translated phrase from the plurality of translated phrases in the phrasebook; and translate the first token by replacing the first source phrase with the corresponding translated phrase from the plurality of translated phrases in the phrasebook;

the application server further configured to generate a translated dynamic Web page, wherein the translated dynamic Web page comprises the corresponding translated phrase and the second token comprising the second source phrase;

determining the second token contains sensitive content based at least in part on the user, and performing security measures by replacing the second token with content-neutral text;

determining whether the first source phrase is associated with a uniform resource identifier (URI), wherein the URI is associated with the Web page requested by the user;

associating, by the one or more computers, the first source phrase to the URI if the first source phrase was not associated with the URI;

determining the first target dialect is associated with a target language based at least in part on a location of the financial institution;

determining a second dialect associated with the target language;

determining a plurality of second-dialect translated phrases, wherein each of the plurality of second-dialect translated phrases corresponds to a translation into the second dialect of one of the plurality of source phrases;

determining one or more of the plurality of source phrases having a corresponding target-dialect translated phrase and a corresponding second-dialect translated phrase;

selecting the corresponding target-dialect translated phrase based on the location of the financial institution;

selecting the corresponding second-dialect translated phrase when no corresponding target-dialect translated phrase exists; and providing the translated dynamic Web page to the user of the financial institution.

9. The system of claim 8 wherein:

the dynamic Web page content further comprises a third source phrase; and the translation engine is further configured to replace the third source phrase with a corresponding one of the one or more second-dialect translated phrases.

10. The system of claim 8 wherein the translation engine is further configured to leave intact the second source phrase from the second token processed from the dynamic Web page content.

11. The system of claim 8 wherein the application server further comprises a phrase cache comprising a plurality of phrases associated with a current application context.

12. The system of claim 8 wherein the application database comprises the phrasebook.

13. A method for maintaining a database of translated content, comprising:

providing a database storing a plurality of source phrases in a source natural language dialect and a plurality of translated phrases, each of the plurality of translated phrases being a translation into a first target dialect of one of the plurality of source phrases;

providing an application server that provides an application service comprising generating dynamic Web page content for Internet banking responsive to a Web page request from a user of a financial institution, wherein the dynamic Web page content comprises one or more phrases in the source natural language dialect;

processing the dynamic Web page content into at least a first token and a second token, wherein the first token comprises a first source phrase and the second token comprises a second source phrase;

determining the first token is translatable and the second token is non-translatable;

identifying, based at least in part on determining the first token is translatable, that the first source phrase of the first token is a candidate phrase having a translatable component for addition to the database, said candidate phrase being one of the one or more phrases, and adding the translatable component of the candidate phrase to the plurality of source phrases, said steps of identifying and adding being performed by the application server;

translating the first token, wherein the translatable component of the candidate phrase of the first token is translated into a translated component in the first target dialect;

adding the translated component of the first token to the plurality of translated phrases in the database;

determining the second token contains sensitive content based at least in part on the user, and performing security measures by replacing the second token with content-neutral text;

determining whether the first source phrase is associated with a uniform resource identifier (URI), wherein the URI is associated with the Web page requested by the user;

associating, by the one or more computers, the first source phrase to the URI if the first source phrase was not associated with the URI;

determining the first target dialect is associated with a target language based at least in part on a location of the financial institution;

determining a second dialect is associated with the target language;

determining a plurality of second-dialect translated phrases, wherein each of the plurality of second-dialect translated phrases corresponds to a translation into the second dialect of one of the plurality of source phrases;

determining one or more of the plurality of source phrases having a corresponding target-dialect translated phrase and a corresponding second-dialect translated phrase;

selecting the corresponding target-dialect translated phrase baseed on the location of the financial institution;

selecting the corresponding second-dialect translated phrase when no corresponding target-dialect translated phrase exists; and providing the translated dynamic Web page to the user of the financial institution.

14. The method of claim 13 wherein the steps of identifying that the first source phrase of the first token is the candidate phrase and adding the translatable component of the candidate phrase to the plurality of source phrases are performed automatically while the application server provides the application service.

15. The method of claim 13 wherein the steps of identifying that the first source phrase of the first token is the candidate phrase and adding the translatable component of the candidate phrase to the plurality of source phrases are performed in the background by the application server.

16. The method of claim 13 further comprising omitting a non-translatable component of the candidate phrase when the translatable component of the candidate phrase is added to the plurality of source phrases.

17. The method of claim 13 wherein the translated component is added to the plurality of translated phrases while the application server provides the application service.

18. The method of claim 13 further comprising restricting access to the database to an authorized entity.

19. The method of claim 13 wherein the translatable component comprises a pattern request.

20. The method of claim 19 wherein the translatable component further comprises a variable component.

21. A system for collecting translatable dynamic Web page content, comprising:
a Web server;
a database server comprising a database storing a plurality of source phrases in a source natural language dialect and a plurality of translated phrases, each one of the plurality of translated phrases corresponding to one of the plurality of source phrases;
an application server designed and configured to provide an application service for Internet banking in response to a request received by the Web server from a user of a financial institution, said application service comprising generating a dynamic Web page comprising one or more phrases in the source natural language dialect;
the application server being further designed and configured to:
process the dynamic Web page into a first token comprising a first source phrase and a second token comprising a second source phrase;
determine the first token is translatable and the second token is non-translatable;
identify, based at least in part on the determination that the first token is translatable, that the first source phrase of the first token is a candidate phrase for addition to the database, said candidate phrase being one of the one or more phrases and having a translatable component; and
translate the first token, wherein the translatable component of the candidate phrase of the first token is translated into the source natural language dialect, and to add the translatable component to the plurality of source phrases stored in the database;
determining the second token contains sensitive content based at least in part on the user, and performing security measures by replacing the second token with content-neutral text;
determining whether the first source phrase is associated with a uniform resource identifier (URI), wherein the URI is associated with the Web page requested by the user;
associating, by the one or more computers, the first source phrase to the URI if the first source phrase was not associated with the URI;
determining a target dialect is associated with a target language based at least in part on a location of the financial institution;
determining a second dialect is associated with the target language;
determining a plurality of second-dialect translated phrases, wherein each of the plurality of second-dialect translated phrases corresponds to a translation into the second dialect of one of the plurality of source phrases;
determining one or more of the plurality of source phrases having a corresponding target-dialect translated phrase and a corresponding second-dialect translated phrase;
selecting the corresponding target-dialect translated phrase based on the location of the financial institution;
selecting the corresponding second-dialect translated phrase when no corresponding target-dialect translated phrase exists; and
providing the translated dynamic Web page to the user of the financial institution.

22. The system of claim 21 wherein the application server is further designed and configured to automatically identify a candidate phrase for addition to the database and add the translatable component to the plurality of source phrases stored in the database while the application server provides the application service.

23. The system of claim 21 wherein the application server is further designed and configured to identify a candidate phrase for addition to the database and to add the translatable component to the plurality of source phrases stored in the database during background processing of the application server.

24. The system of claim 21 wherein the translation engine is further designed and configured to omit a non-translatable component of the candidate phrase when adding the translatable component to the plurality of source phrases stored in the database.

25. A non-transitory computer readable storage medium comprising instructions for generating translated dynamic Web page content by:
storing a plurality of source phrases in a source natural language dialect, and a plurality of translated phrases in a phrasebook database, each of the plurality of translated phrases corresponding to a translation into a target dialect of one of the plurality of source phrases;
providing an application server that generates dynamic Web page content for Internet banking responsive to a Web page request from a user, wherein the dynamic Web page content comprises a first source phrase and a second source phrase of a financial institution;
processing the dynamic Web page content into at least a first token and a second token, wherein the first token comprises the first source phrase and the second token comprises the second source phrase;
determining the first token is translatable and the second token is non-translatable; translating the first token by replacing the first source phrase with a corresponding translated phrase of the target dialect of the plurality of translated phrases stored in the phrasebook database;
generating a translated Web page based at least in part on the dynamic Web page content, wherein the translated dynamic Web page comprises the translated first token and the second token comprising the source phrase;
determining the second token contains sensitive content based at least in part on the user, and performing security measures by replacing the second token with content-neutral text; determining whether the first source phrase is associated with a uniform resource identifier (URI), wherein the URI is associated with the Web page requested by the user;
associating, by the one or more computers, the first source phrase to the URI if the first source phrase was not associated with the URI;
determining the target dialect is associated with a target language based at least in part on a location of the financial institution;
determining a second dialect is associated with the target language;
determining a plurality of second-dialect translated phrases, wherein each of the plurality of second-dialect translated phrases corresponds to a translation into the second dialect of one of the plurality of source phrases;

determining one or more of the plurality of source phrases having a corresponding target-dialect translated phrase and a corresponding second-dialect translated phrase;

selecting the corresponding target-dialect translated phrase based on the location of the financial institution;

selecting the corresponding second-dialect translated phrase when no corresponding target-dialect translated phrase exists; and providing the translated dynamic Web page to the user of the financial institution.

* * * * *